Figure 1:
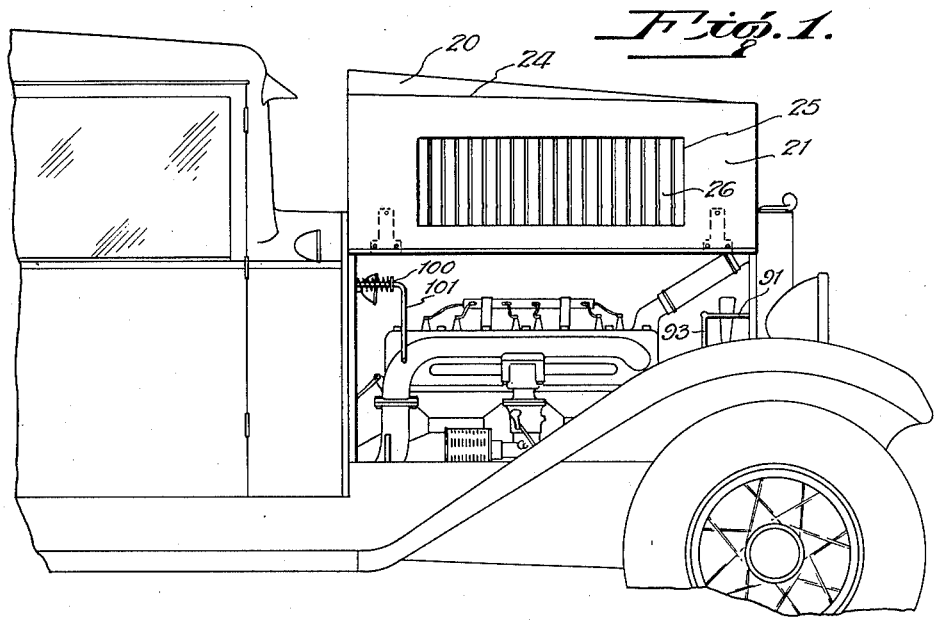

May 29, 1934.    A. PASCOO    1,960,953
HOOD CONSTRUCTION FOR MOTOR VEHICLES
Filed April 7, 1932    5 Sheets-Sheet 1

Inventor
ALEX PASCOO
By his Attorneys
Ely & Pattison

May 29, 1934.　　　　　A. PASCOO　　　　　1,960,953

HOOD CONSTRUCTION FOR MOTOR VEHICLES

Filed April 7, 1932　　　5 Sheets-Sheet 2

Inventor
ALEX PASCOO.
By his Attorneys
Ely & Pattison

May 29, 1934.  A. PASCOO  1,960,953
HOOD CONSTRUCTION FOR MOTOR VEHICLES
Filed April 7, 1932  5 Sheets-Sheet 3
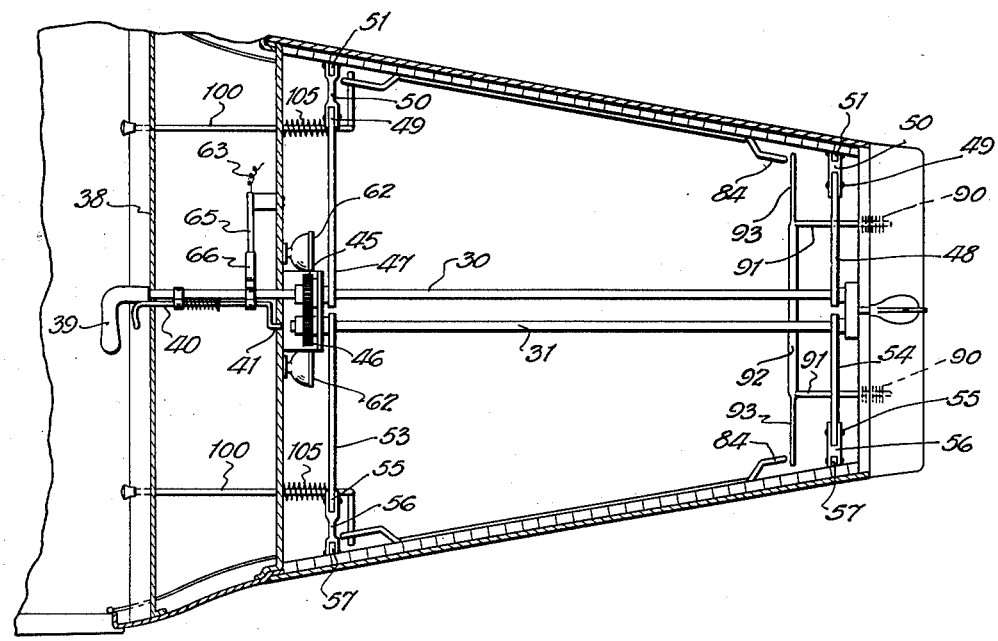
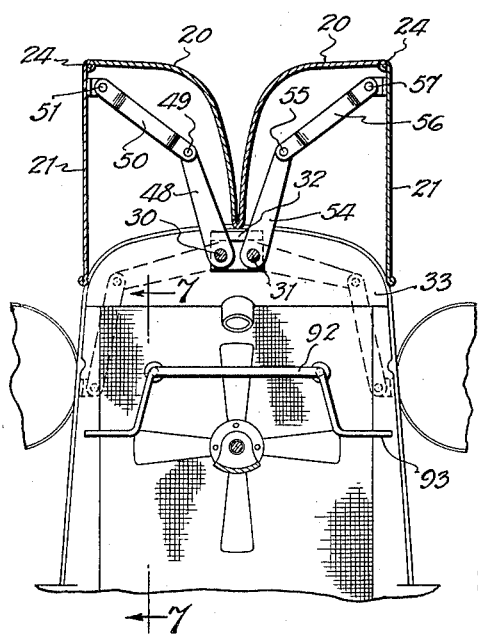
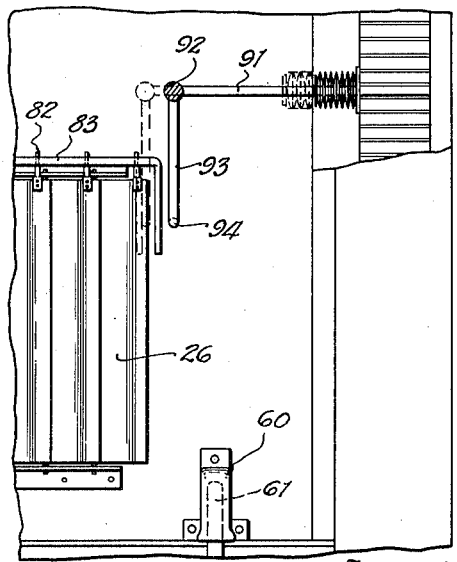
Inventor
ALEX PASCOO.
By his Attorneys
Ely & Pattison

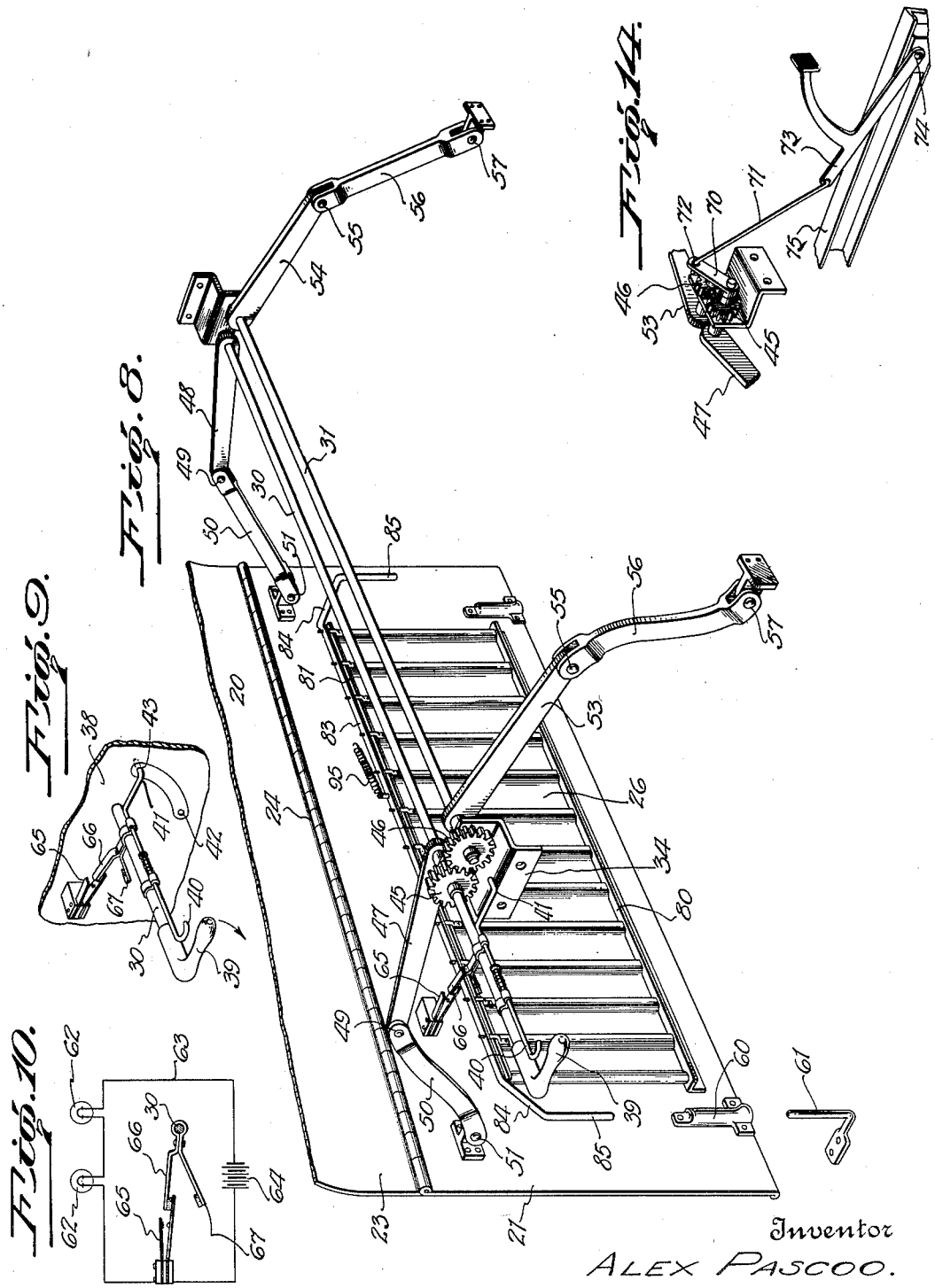

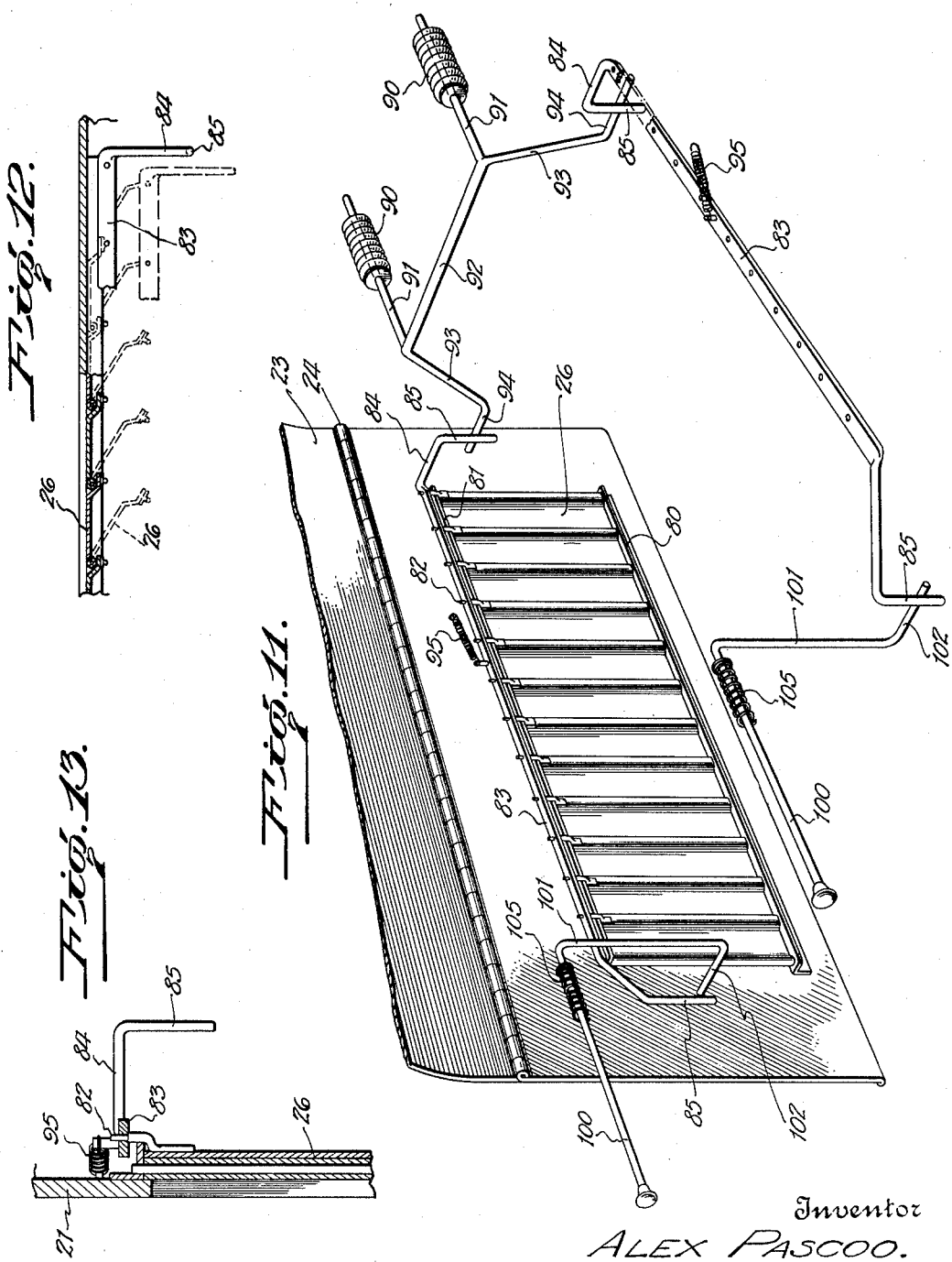

Patented May 29, 1934

1,960,953

UNITED STATES PATENT OFFICE 1,960,953

HOOD CONSTRUCTION FOR MOTOR VEHICLES

Alex Pascoo, New York, N. Y.

Application April 7, 1932, Serial No. 603,704

3 Claims. (Cl. 180—69)

This invention relates to enclosures for machinery, and more particularly it pertains to hoods of motor vehicles for enclosing the power plant of the vehicle.

One object of the present invention is to improve the construction and mode of operation of devices of the afore-mentioned type, and to provide such devices with means whereby they may be operated from the driving compartment of the vehicle.

A feature of the present invention resides in a new and novel construction whereby the hood of a motor vehicle may be moved both to open and closed positions from the driving compartment, preferably from a location closely adjacent the driver's seat of the vehicle.

A further feature of the invention resides in novel means whereby the hood of the vehicle may be locked in either its open or closed position, or at least held against movement from either position to the other position.

Still a further feature of the invention resides in a novel hood construction whereby the admission of cooling air to the interior of the motor compartment may be controlled.

Still a further feature of the invention resides in an automatically operating control means which may also be manually operated.

Still a further feature of the invention resides in the combination of suitable illuminating means for the interior of the motor compartment which illuminating means is automatically operated when the hood is moved to its open position to effect an illumination of the interior of the motor hood and to extinguish the illuminating means when the hood is moved to closed position.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form, and the following detailed description of the construction therein shown.

Figure 2:
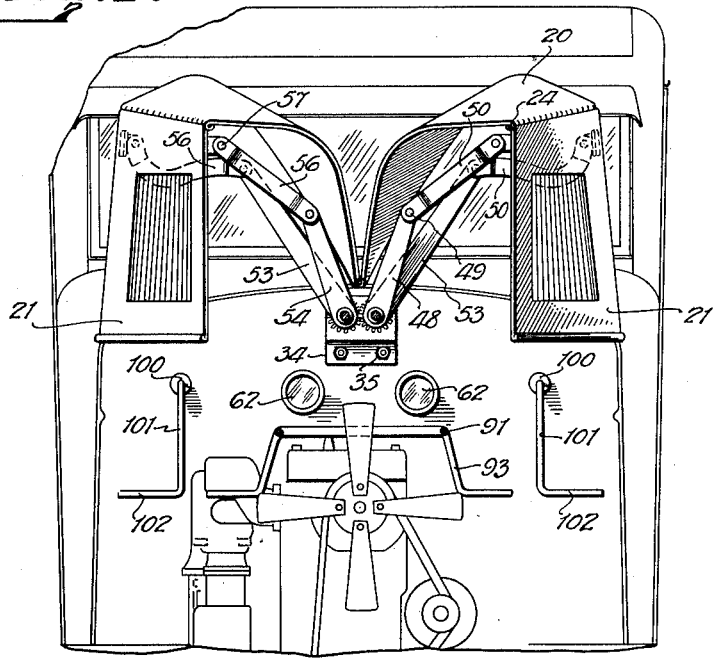
Figure 3:
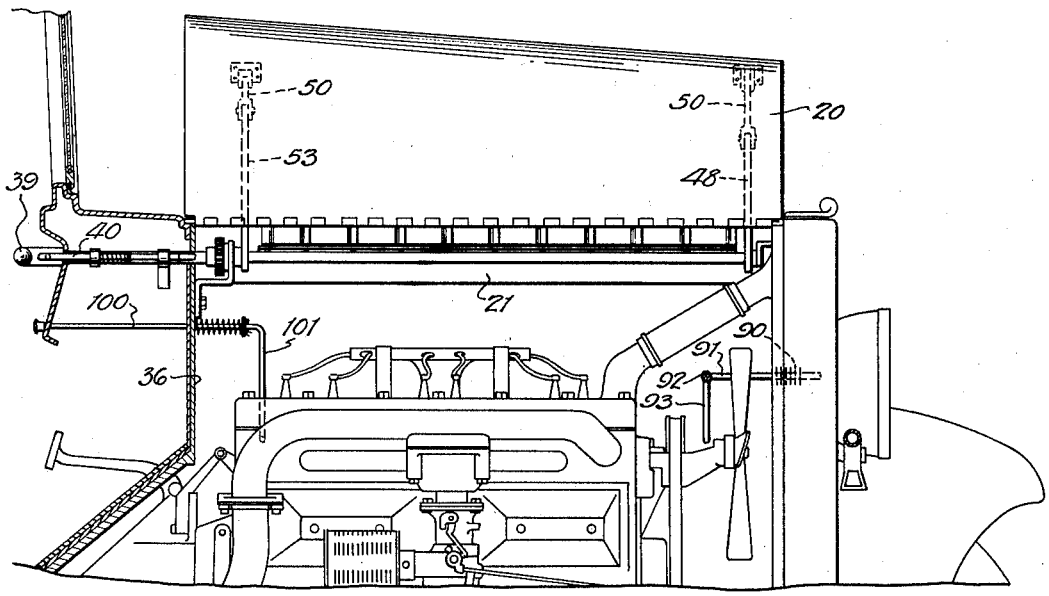
Figure 4:
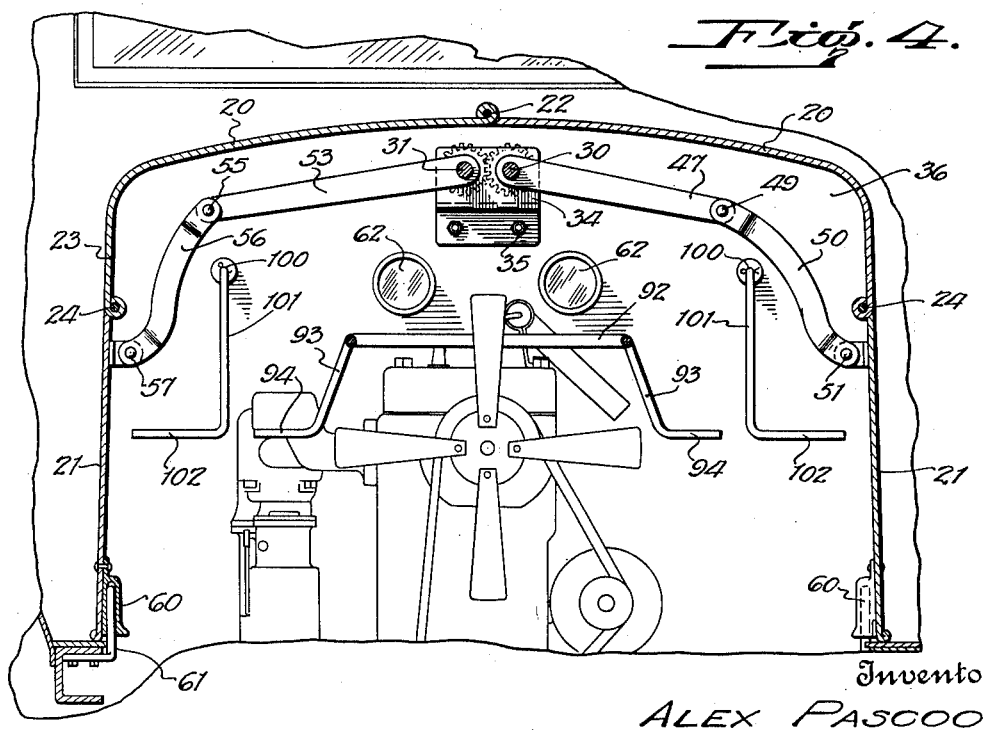

In the drawings:

Figure 1 is a view in side elevation of the forward portion of a motor vehicle showing a hood constructed in accordance with the present invention, the hood being shown in open position, Figure 2 is a view partly in end elevation and partly in section, illustrating the hood in its open position, Figure 3 is an enlarged view partly in elevation, and partly in longitudinal section showing the hood in its open position, Figure 4 is a transverse vertical sectional view, Figure 5 is a horizontal sectional view of the hood, showing the hood operating mechanism in plan, Figure 6 is a transverse vertical sectional view on a reduced scale, taken in the opposite direction to Figure 2, Figure 7 is a fragmentary view partly in section illustrating the automatic means for controlling the ingress and egress of air to and from the interior of the hood, Figure 8 is a perspective view of one side of the hood, and showing the hood operating mechanism and the ventilator operating mechanism on an enlarged scale, Figure 9 is a fragmentary perspective view illustrating a detail of the mechanism, Figure 10 is a diagrammatic view illustrating the illuminating system of the device, Figure 11 is a view similar to Figure 8, showing the means for controlling the ingress and egress of air to and from the hood, Figure 12 is a fragmentary sectional view, Figure 13 is a detail fragmentary sectional view illustrating the operating means for controlling the ingress and egress of air to and from the interior of the hood, and;

Figure 14 is a detail perspective view illustrating a modified form of mechanism for operating the hood.

In the present illustration of the invention, the hood per se is of conventional construction in that it comprises two top sections 20, and two side sections 21. The top sections 20 are hingedly mounted as at 22 in the conventional manner and have short depending side portions 23 to which the side sections 21 are hingedly connected as at 24, all in the manner of conventional motor compartment hoods for motor vehicles.

The hood is moved to open position by elevation of the side sections 21 thereof which causes the top sections 20 to rock about their hinged points 22 and the side sections 21 to rock about their hinge points 24.

The hood herein illustrated differs slightly from conventional automobile hoods in that the louvre openings usually employed are eliminated, and each of the side sections 21 is provided with an opening 25 which extends throughout the major portion thereof and which is preferably of rectangular shape. In this form of hood, these side openings 25 are closed by a plurality of swinging shutters 26, the specific construction and operation of which will be hereinafter described.

The present invention provides means for operating the top sections 20 and side sections 21 to open and close the hood which means is capable of operation from the driver's compartment of a vehicle on which the hood is mounted and as herein illustrated, this means consists of two shafts 30 and 31 which extend longitudinally of the motor compartment. The shafts 30 and 31 may be mounted at their forward ends in a bracket or the like 32 which may be secured to the rear face of the radiator dome or head 33. At their rear ends these shafts may be mounted in a bracket 34 which is secured as at 35 to the rear wall of the motor compartment, said rear wall being designated 36 in Figure 4.

One of the shafts, for example the shaft 30, may be extended through the instrument board or panel 38 and provided with a handle or the like 39 by means of which it may be rotated. A latch member 40 may be carried by this member which latch member has a right-angular extension 41 engageable in either one of two openings 42 or 43 to secure the shaft in either of its operated positions. This detail of construction is illustrated in Figure 9 of the drawings.

As more clearly illustrated in Figures 5 and 8 of the drawings, the shaft 30 is provided with a gear 45 and this gear 45 meshes with a gear 46 carried by the shaft 31. By this means the shaft 31 will be operated when the shaft 30 is operated by its operating handle 39.

The shaft 30 is provided with two rigidly attached arms 47 and 48, and connected to each of these arms by a pivotal connection 49 there is a link 50, which link is pivotally attached as at 51 to one of the side sections 21 of the hood.

Secured to the shaft 31, there are two rigidly attached arms 53 and 54, and pivotally attached to each of these arms as at 55, there is a link 56 which in turn is pivotally mounted as at 57 to the other side section 21 of the hood.

From the foregoing it will be apparent that when the hood is closed, as the shafts 30 and 31 are rotated in the manner heretofore described, the arms 47, 48, 53, and 54 will be raised and through the medium of the links 50 and 56 will elevate the side sections 21 of the hood as illustrated in Figures 2 and 6 of the drawings.

The gears 45 and 46 will be of such size that substantially a quarter turn or less of the shaft 30 will be sufficient to impart a movement to the sections of the hood which will completely open the motor compartment of the vehicle as illustrated in Figures 2 and 6, and when this has been done, and the right angular end of the latch member 40 is engaged with the opening 43, the hood will be retained in its elevated position. Likewise, when the right angular extension 41 of the latch member 40 is engaged with the opening 42, the hood will be securely held in its closed position, assuming of course that the vehicle is of the closed type, and is locked to prevent access to the operating handle 39 of the shaft 30.

Each of the side sections 21 of the hood may be provided with sockets or the like 60 in which posts 61 carried by the vehicle side frames may be received to guide and hold the hood sections 21 against outward movement when they are closed.

Means is provided for illuminating the motor compartment when the hood is raised and this illuminating means is preferably automatically operated. The illuminating means may consist of one or more lamps 62, of which two are shown herein and said lamps are in a circuit designated 63 connected with a battery 64 and including a switch 65. Carried by the shaft 30 there are two arms 66 and 67, and these arms are so arranged that when the hood is closed the arm 66 will operate to open the switch 65 and break the circuit as illustrated in Figure 10 and when the hood is moved to open position the other arm 67 will operate to close the switch and maintain it closed so as to complete the circuit to the lamps 62 when the hood is in its open position.

In lieu of having a handle 39 by means of which it may be operated, the shaft 30 may be provided with a crank 70 to which a link 71 is pivotally connected as at 72 and the said link may be connected with a foot lever 73 pivotally mounted as at 74 on one of the side frames 75 for example, of a chassis and by this means the shaft 30 may be rotated by the foot of an operator instead of by hand, as heretofore described. This modified construction is illustrated in Figure 14 of the drawings.

The pivotally mounted shutters 26 which have heretofore been mentioned as closing the openings 25 in the side sections 21 of the hood are mounted in suitable supports 80 and 81 herein illustrated as angle irons, their construction being shown in Figures 8 and 11 of the drawings. Each shutter has a crank arm 82 and connected to all of the crank arms 82 of the shutters 26 there is an operating bar or rod 83. This operating bar or rod 83 has extended portions 84 terminating in downwardly extending portions 85 at each end thereof. This construction is the same in each side section or member of the hood, and but one will therefore be described.

A suitable automatic means which is thermally operated by the temperature of the cooling medium in the radiator may be provided for automatically operating the shutters 26 and this means comprises, in the present embodiment of the invention, a plurality of thermal elements 90. These thermal elements 90 are mounted in, or adjacent to the radiator of the vehicle and each has connected thereto a rod 91 which rods are connected by a cross rod 92 having depending portions 93 which terminate in angular portion 94, the latter being in the path of the forward depending portions 85 of the members 83.

The several parts are so arranged that as the cooling medium of the motor heats to a predetermined degree of temperature, the thermal elements will operate the cross rod 92 and through the medium of the members 83 will move the shutters 26 to the open position, there being a spring or similar means 95 connected at one end to the side sections and at the other end to its respective members 83 and tending at all times to maintain the shutters in closed position. Thus, as the temperature of the cooling medium rises, the shutters will be moved to open position to allow a greater circulation of air through the motor compartment, they being operated in this manner by the thermal members 90 and as the cooling medium cools beyond a predetermined point, the springs 95 acting upon their respective members 83 serve to move the shutters 26 to their closed position.

Means is also provided whereby these shutters may be moved to their open positions manually and this means differs from the automatic means in that the shutters in each side section of the hood may be separately operated thereby.

In the present embodiment of the invention, this manually operated means consists of two members 100, which are reciprocatingly mounted in the instrument board or panel of the vehicle. These members each extend forwardly and each has a downwardly extended portion 101 terminating in an angular extremity 102. These angular extremities are in the path of the vertical portion 85 of their respective members 83 as best illustrated in Figure 11. Thus as either of these members is reciprocated, its respective member 83 will be operated to move the shutters which the member 83 operates to the open position against the action of the spring 95. Suitable springs 105 are employed to return the members 100 to their normal positions.

Thus it will be apparent that by the manually operated means the shutters on either side of the hood may be selectively and independently operated as distinguished from the automatic operation of the shutters by the thermally controlled means.

From the foregoing it will be apparent that the present invention provides a new and improved construction whereby the hood of the engine or motor compartment of a motor vehicle may be raised from the driver's seat, may be maintained in either its closed or open position, and held under certain conditions against operation. Furthermore, the invention provides for automatically and manually controlling the ventilation of the engine or motor compartment which is formed by the hood enclosure.

While the invention has been herein illustrated in a preferred form, it is to be understood that the invention is not to be limited to the specific details of construction herein shown, and that it may be practiced in other forms without departing from the spirit thereof.

Having thus described the invention, what I claim as new and desire to secure by Letters Patent is:—

1. In a motor vehicle, a hood structure comprising end walls, a plurality of sections pivotally mounted in the end walls and forming the top wall of the hood, a section pivotally connected to each of said sections forming the top wall, and means operable from the driver's seat of the vehicle for operating said last mentioned sections to open and close said hood, said last mentioned means comprising a pair of shafts extending lengthwise of the hood, levers connecting said shafts to the side sections of the hood, means adjacent the driver's seat for rotating one of said shafts and means for operating the other shaft from said rotated shaft.

2. A hood for motor vehicles comprising in combination, spaced end walls, a pair of sections pivotally mounted in the end walls and forming the top wall of the hood, a section pivotally mounted on each of said first mentioned sections and forming the side walls of the hood, a pair of shafts rotatably mounted in the end walls of the hood, meshing gears on said shafts whereby they may be simultaneously rotated, means for rotating one of said shafts and levers connecting said shafts to the second mentioned pivoted sections of the hood whereby upon rotation of one of the shafts, the hood will be opened or closed.

3. A hood for motor vehicles comprising in combination, spaced end walls, a pair of sections pivotally mounted in the end walls and forming the top wall of the hood, a section pivotally mounted on each of said first mentioned sections and forming the side walls of the hood, a pair of shafts rotatably mounted in the end walls of the hood, meshing gears on said shafts whereby they may be simultaneously rotated, means for rotating one of said shafts and levers connecting said shafts to the second mentioned pivoted sections of the hood whereby upon rotation of one of the shafts, the hood will be opened or closed, and means for locking said operating means in either the open or closed position of the hood.

ALEX PASCOO.